(12) United States Patent
Takeuchi et al.

(10) Patent No.: US 11,515,570 B2
(45) Date of Patent: Nov. 29, 2022

(54) SECONDARY BATTERY

(71) Applicant: NGK INSULATORS, LTD., Nagoya (JP)

(72) Inventors: Yukihisa Takeuchi, Nagoya (JP); Iwao Owada, Nagoya (JP); Yukinobu Yura, Nagoya (JP); Yosuke Sato, Nagoya (JP); Toshihiro Yoshida, Nagoya (JP); Yuji Katsuda, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 166 days.

(21) Appl. No.: 16/865,462

(22) Filed: May 4, 2020

(65) Prior Publication Data

US 2020/0266494 A1    Aug. 20, 2020

Related U.S. Application Data

(63) Continuation of application No. PCT/JP2018/040686, filed on Nov. 1, 2018.

(30) Foreign Application Priority Data

Nov. 10, 2017  (JP) .............................. JP2017-217188
Dec. 8, 2017   (JP) .............................. JP2017-235917

(51) Int. Cl.
  *H01M 10/0585*   (2010.01)
  *H01M 4/485*     (2010.01)
  (Continued)

(52) U.S. Cl.
  CPC ....... *H01M 10/0585* (2013.01); *H01M 4/485* (2013.01); *H01M 4/505* (2013.01);
  (Continued)

(58) Field of Classification Search
  CPC ......... H01M 10/0525; H01M 10/0562; H01M 10/0585; H01M 4/485; H01M 4/505; H01M 4/525; H01M 2300/0068
  See application file for complete search history.

(56) References Cited

U.S. PATENT DOCUMENTS

| 6,558,847 B1 * | 5/2003 | Kawakami | ............ H01M 4/505 |
| | | | 429/231.95 |
| 10,454,109 B2 | 10/2019 | Ohira et al. | |

(Continued)

FOREIGN PATENT DOCUMENTS

| JP | 2010-212062 A1 | 9/2010 |
| JP | 2012-099225 A1 | 5/2012 |

(Continued)

OTHER PUBLICATIONS

JP-2012099225-A English machine translation (Year: 2022).*

(Continued)

*Primary Examiner* — Ula C Ruddock
*Assistant Examiner* — Armindo Carvalho, Jr.
(74) *Attorney, Agent, or Firm* — Burr & Brown, PLLC

(57) ABSTRACT

Provided is a secondary battery including: a positive electrode plate composed of an inorganic material containing a positive electrode active material in an oxide form and having a thickness of 25 μm or more; a negative electrode plate composed of an inorganic material containing a negative electrode active material in an oxide form and having a thickness of 25 μm or more; and an inorganic solid electrolyte, the secondary battery being charged and discharged at a temperature of 100° C. or higher.

18 Claims, 4 Drawing Sheets

(51) Int. Cl.
*H01M 4/505* (2010.01)
*H01M 4/525* (2010.01)
*H01M 10/0525* (2010.01)
*H01M 10/0562* (2010.01)
*H01M 4/02* (2006.01)

(52) U.S. Cl.
CPC ....... *H01M 4/525* (2013.01); *H01M 10/0525* (2013.01); *H01M 10/0562* (2013.01); *H01M 2004/021* (2013.01); *H01M 2300/0068* (2013.01)

(56) References Cited

U.S. PATENT DOCUMENTS

| | | | |
|---|---|---|---|
| 10,629,905 B2 | 4/2020 | Yura et al. | |
| 2002/0074972 A1* | 6/2002 | Narang | H01M 4/5815 320/131 |
| 2006/0275664 A1* | 12/2006 | Ohzuku | C01G 49/009 429/220 |
| 2010/0112443 A1* | 5/2010 | Blomgren | H01M 4/131 429/221 |
| 2014/0079993 A1* | 3/2014 | Lee | H01M 4/1391 429/211 |
| 2014/0099556 A1* | 4/2014 | Johnson | H01M 4/621 429/231.95 |
| 2017/0033398 A1* | 2/2017 | Yokoyama | H01M 4/131 |
| 2017/0179472 A1* | 6/2017 | Allie | H01M 4/505 |
| 2018/0269532 A1 | 9/2018 | Teraoka et al. | |
| 2019/0252682 A1 | 8/2019 | Takeuchi et al. | |

FOREIGN PATENT DOCUMENTS

| | | | |
|---|---|---|---|
| JP | 2012099225 A | * | 5/2012 |
| JP | 2015-065021 A1 | | 4/2015 |
| JP | 2015-185337 A1 | | 10/2015 |
| JP | 2015-534243 A1 | | 11/2015 |
| JP | 2016-066550 A1 | | 4/2016 |
| JP | 2016-100218 A1 | | 5/2016 |
| JP | 2017-033689 A1 | | 2/2017 |
| JP | 2017-084477 A1 | | 5/2017 |
| WO | 2014/058684 A2 | | 4/2014 |
| WO | 2017/146088 A1 | | 8/2017 |
| WO | 2017/188232 A1 | | 11/2017 |
| WO | 2018/088522 A1 | | 5/2018 |

OTHER PUBLICATIONS

International Search Report and Written Opinion (Application No. PCT/JP2018/040686) dated Jan. 8, 2019 (with English translation).
Japanese Office Action (Application No. 2019-552753) dated Jun. 7, 2021 (with English translation).

* cited by examiner

SECONDARY BATTERY

CROSS-REFERENCE TO RELATED APPLICATIONS

This application is a continuation application of PCT/JP2018/040686 filed Nov. 1, 2018, which claims priority to Japanese Patent Application No. 2017-217188 filed Nov. 10, 2017 and Japanese Patent Application No. 2017-235917 filed Dec. 8, 2017, the entire contents all of which are incorporated herein by reference.

BACKGROUND OF THE INVENTION

1. Field of the Invention

The present invention relates to a secondary battery.

2. Description of the Related Art

In recent years, a demand for batteries has greatly prevailed in power sources with the development of portable devices, such as personal computers and mobile phones. The batteries in such applications contain liquid electrolytes (i.e., electrolytic solutions) of, for example, flammable organic diluting solvents that functions as media for ion migration. The batteries including such electrolytic solutions have several problems, such as leakage, combustion and explosion of the electrolytic solution. In order to solve these problems and ensure essential safety, secondary all-solid batteries have been developed that contain solid electrolytes in place of *liquid* electrolytes and all the other components composed of solid material. Since the electrolytes are composed of solid material, the secondary all-solid batteries have little risk of combustion and barely cause these problems, such as leakage of liquid material and deterioration of battery performance due to corrosion.

For example, PTL 1 (JP2016-66550A) discloses a secondary all-solid battery having stable charge/discharge characteristics at high temperature. The battery includes a solid electrolyte composed of a first layer having a NASICON structure containing Li, Al, Ti, and P and a second layer having another NASICON structure containing Li, Al, M (where M is Ge or Zr) and P, and no Ti. This literature also discloses production of a secondary all-solid battery that includes a positive electrode layer having a thickness of 9 µm, a negative electrode layer having a thickness of 12 µm, and a solid electrolyte layer having a thickness of 12 µm.

PTL 2 (JP2015-185337A) discloses an all-solid battery including a positive electrode, a negative electrode, and a solid electrolyte layer, the positive electrode or negative electrode being composed of a lithium titanate ($Li_4Ti_5O_{12}$) sintered body.

PTL 3 (WO2017/146088A) discloses a lithium secondary battery including a solid electrolyte and an oriented positive electrode plate that contains a plurality of primary grains composed of lithium complex oxide, such as lithium cobaltate ($LiCoO_2$), where the primary grains are oriented at a mean orientation angle of more than 0° to 30° to a main face of the positive electrode plate.

CITATION LIST

Patent Literatures

PTL1: JP2016-66550A
PTL2: JP2015-185337A
PTL3: WO2017/146088A

SUMMARY OF THE INVENTION

Unfortunately, the secondary all-solid battery disclosed in PTL 1 is disadvantageous in low capacity or low energy density. The secondary all-solid battery disclosed in PTL 2 also has a problem in that the battery is significantly deteriorated during operations under high-temperature conditions.

The present inventors have now found that a secondary battery including a positive electrode plate and a negative electrode plate each composed of an inorganic material including oxide and having a thickness of 25 µm or more, and an inorganic solid electrolyte layer can have large battery capacity and superior cycle capacity retention in rapid charge/discharge cycles at a temperature of 100° C. or higher.

Accordingly, an object of the present invention is to achieve large battery capacity and superior cycle capacity retention in rapid charge/discharge cycles in a secondary battery.

According to an aspect of the present invention, there is provided a secondary battery comprising:

a positive electrode plate composed of an inorganic material containing a positive electrode active material in an oxide form and having a thickness of 25 µm or more;

a negative electrode plate composed of an inorganic material containing a negative electrode active material in an oxide form and having a thickness of 25 µm or more; and an inorganic solid electrolyte layer, wherein the battery is charged and discharged at a temperature of 100° C. or higher.

According to another aspect of the present invention, there is provided a method of using a secondary battery, comprising the steps of:

providing the secondary battery including a positive electrode plate composed of an inorganic material containing a positive electrode active material in an oxide form and having a thickness of 25 µm or more; a negative electrode plate composed of an inorganic material containing a negative electrode active material in an oxide form and having a thickness of 25 µm or more; and an inorganic solid electrolyte layer, and heating the secondary battery at a temperature of 100° C. or higher for charging and discharging.

According to another aspect of the present invention, there is provided a method of manufacturing the secondary battery, comprising the steps of:

placing inorganic solid electrolyte powder having a melting point lower than the melting point or pyrolytic temperature of the positive electrode plate or the negative electrode plate on one of the positive electrode plate and the negative electrode plate;

placing the other of the positive electrode plate and the negative electrode plate on the inorganic solid electrolyte powder;

pressing the negative electrode plate toward the positive electrode plate, or the positive electrode plate toward the negative electrode plate at 100 to 600° C. to melt the solid electrolyte powder and permeate the melt into the pores in the positive electrode plate and/or the negative electrode plate; and

DETAILED DESCRIPTION OF THE INVENTION

Secondary Battery

The present invention relates to a secondary battery. In the present specification, the term "secondary battery" refers to as a battery that can be repeatedly charged and discharged in a broad sense, and any battery that includes a positive electrode plate, a negative electrode plate, and a solid electrolyte layer each composed of an inorganic material as described later. Examples of such a secondary battery include a secondary lithium battery (also referred to as a secondary lithium ion battery), a secondary sodium ion battery, a secondary magnesium ion battery, and a secondary aluminum ion battery, and preferred is a secondary lithium ion battery.

Figure 1:
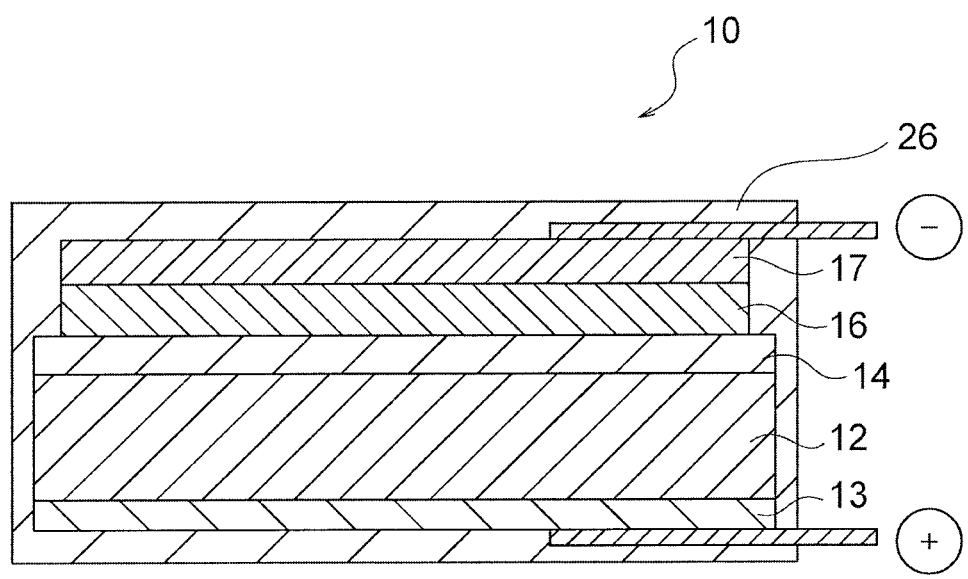
FIG. 1 is a schematic cross-sectional view illustrating a secondary battery of the present invention.

FIG. 1 schematically illustrates an exemplary secondary battery of the present invention. The secondary battery 10 shown in FIG. 1 includes a positive electrode plate 12, an inorganic solid electrolyte layer 14, and a negative electrode plate 16. The positive electrode plate 12 is composed of an inorganic material containing a positive electrode active material in an oxide form. The negative electrode plate 16 is composed of an inorganic material containing a negative electrode active material in an oxide form. The positive electrode plate 12 and the negative electrode plate 16 each have a thickness of at least 25 μm. The secondary battery 10 is charged and discharged at a temperature of 100° C. or higher. As described above, in a secondary battery including the positive electrode plate 12 and the negative electrode plate 16 each composed of an inorganic material containing oxide and the inorganic solid electrolyte layer 14, the positive electrode plate 12 and the negative electrode plate 16 each having a thickness of at least 25 μm and the charge/discharge cycles at a temperature of 100° C. or higher result in large battery capacity, and superior cycle capacity retention in rapid charge/discharge cycles of the secondary battery 10. Since the positive electrode plate 12 and the negative electrode plate 16 each have large thickness as described above, the secondary battery 10 can exhibit the large battery capacity. In other words, the positive electrode plate 12 and the negative electrode plate 16, which are composed of ceramic material, can have an increased thickness as needed, resulting in large capacity and high energy density. In the case that such a secondary battery 10 is charged and discharged at a high temperature of 100° C. or higher, rapid charge/discharge characteristics can be achieved. That is, the secondary battery 10 can be stably operated at a high rate and at the above temperature. In addition, the large capacity can be maintained even in rapid charge/discharge cycles, i.e., a high cycle capacity retention can be achieved.

Accordingly, the secondary battery 10 is charged and discharged at an operational temperature of 100° C. or higher, preferably 100 to 300° C., more preferably 100 to 200° C., further more preferably 100 to 150° C. Examples of a heating means achieving such an operational temperature include various heaters and devices that generate heat. Preferred examples of the heating means include electro-conductive ceramic heaters. In other words, the secondary lithium battery of the present invention is preferably provided as a secondary battery system including a heating means.

The positive electrode plate 12 is composed of inorganic material, and the inorganic material contains a positive electrode active material in an oxide form. The positive electrode active material in the oxide form may be appropriately selected depending on the type of secondary battery 10, and is not particularly limited. For example, the positive electrode active material is preferably lithium complex oxide in secondary lithium ion battery. The lithium complex oxide is an oxide represented by $Li_xMO_2$ ($0.05 < x < 1.10$, M is at least one transition metal, and M typically contains at least one selected from the group of Co, Mn and Al). The lithium complex oxide has a layered rock salt structure. The layered rock salt structure is a crystal structure in which a lithium layer and a transition metal layer other than lithium are alternately stacked with an oxygen layer therebetween, i.e., a crystal structure in which a transition metal ion layer and a lithium single layer are alternately stacked with oxide ions therebetween (typically an $\alpha$-$NaFeO_2$ structure, i.e., a structure in which transition metals and lithium metals are regularly disposed along the [111] axis of a cubic rock salt structure). Examples of lithium complex oxides include $Li_xCoO_2$ (lithium cobaltate), $Li_xNiO_2$ (lithium nickelate), $Li_xMnO_2$ (lithium manganate), $Li_xNiMnO_2$ (lithium nickel manganate), $Li_xNiCoO_2$ (lithium nickel cobaltate), $Li_xCoNiMnO_2$ (lithium cobalt nickel manganate), $Li_xCoMnO_2$ (lithium cobalt manganate), and solid solutions of $Li_2MnO_3$ and the above compounds, and particularly preferably, $Li_xCoO_2$ (lithium cobaltate, typically $LiCoO_2$). The lithium complex oxide may contain at least one element selected from Mg, Al, Si, Ca, Ti, V, Cr, Fe, Cu, Zn, Ga, Ge, Sr, Y, Zr, Nb, Mo, Ag, Sn, Sb, Te, Ba, Bi, and W. Alternatively, the lithium complex oxide having another crystal structure is suitably used, such as $LiMn_2O_4$ and $LiNi_{0.5}Mn_{1.5}O_4$ having a spinel structure, and $LiMPO_4$ having an olivine structure (where M is at least one selected from Fe, Co, Mn and Ni).

It is preferred that a plurality of grains of the positive electrode active material contained in the positive electrode plate 12 be physically and electrically connected to each other from the viewpoint of an improvement in electron conductivity and ion conductivity with an increased energy density. Accordingly, the positive electrode plate 12 is preferably a sintered plate (e.g., a lithium complex oxide sintered plate). In the use of the sintered plate, the positive electrode plate contains no binder and thereby exhibits high packing density of the positive electrode active material (e.g., lithium complex oxide), resulting in a large capacity and high charge/discharge efficiency. The positive electrode plate contains no binder for the reason that the binder disappears or burns off during firing even if the green sheet contains the binder.

Figure 2:
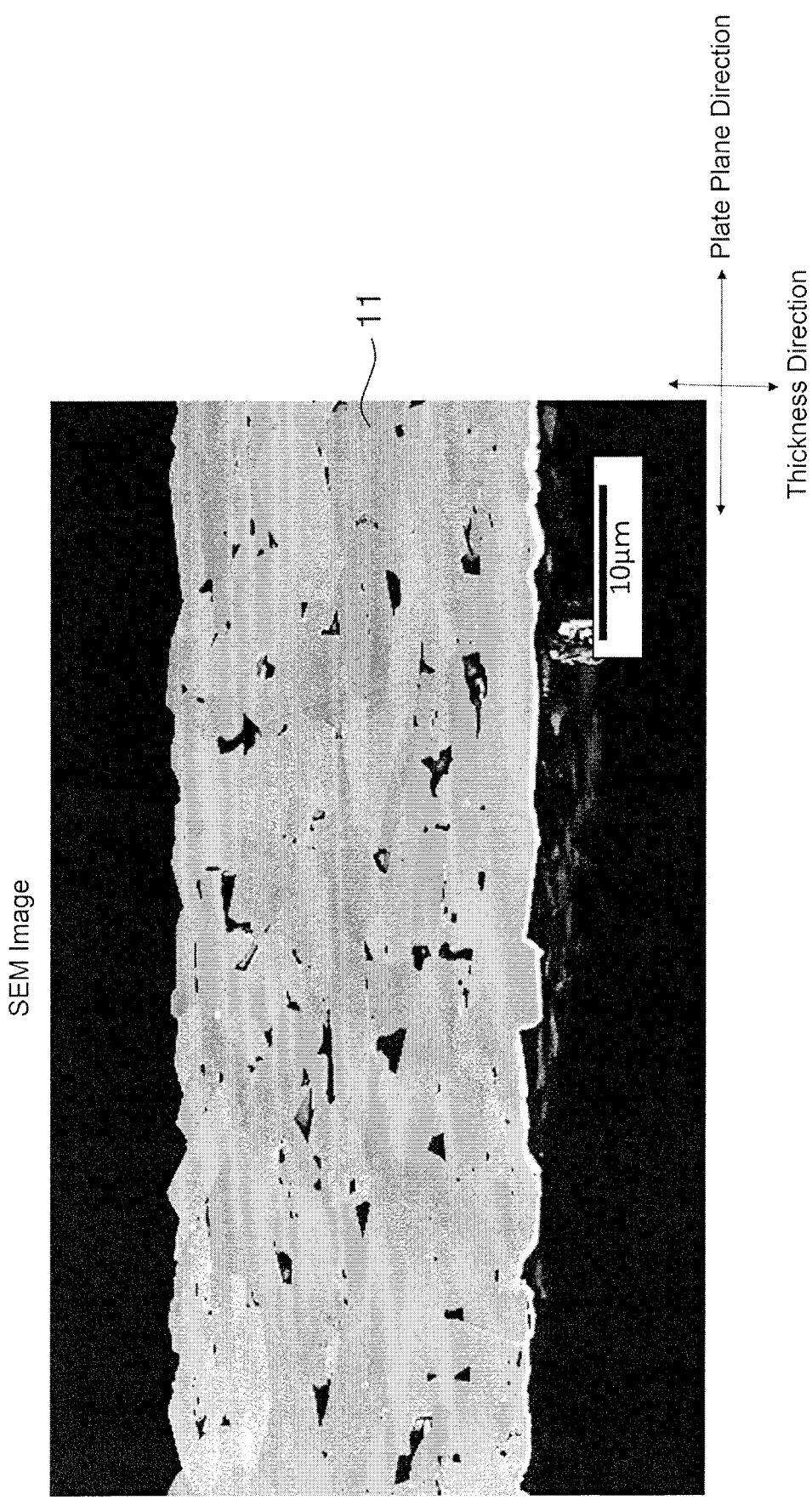
FIG. 2 is an SEM image illustrating an exemplary cross-section perpendicular to a main face of an oriented positive electrode plate.
Figure 3:
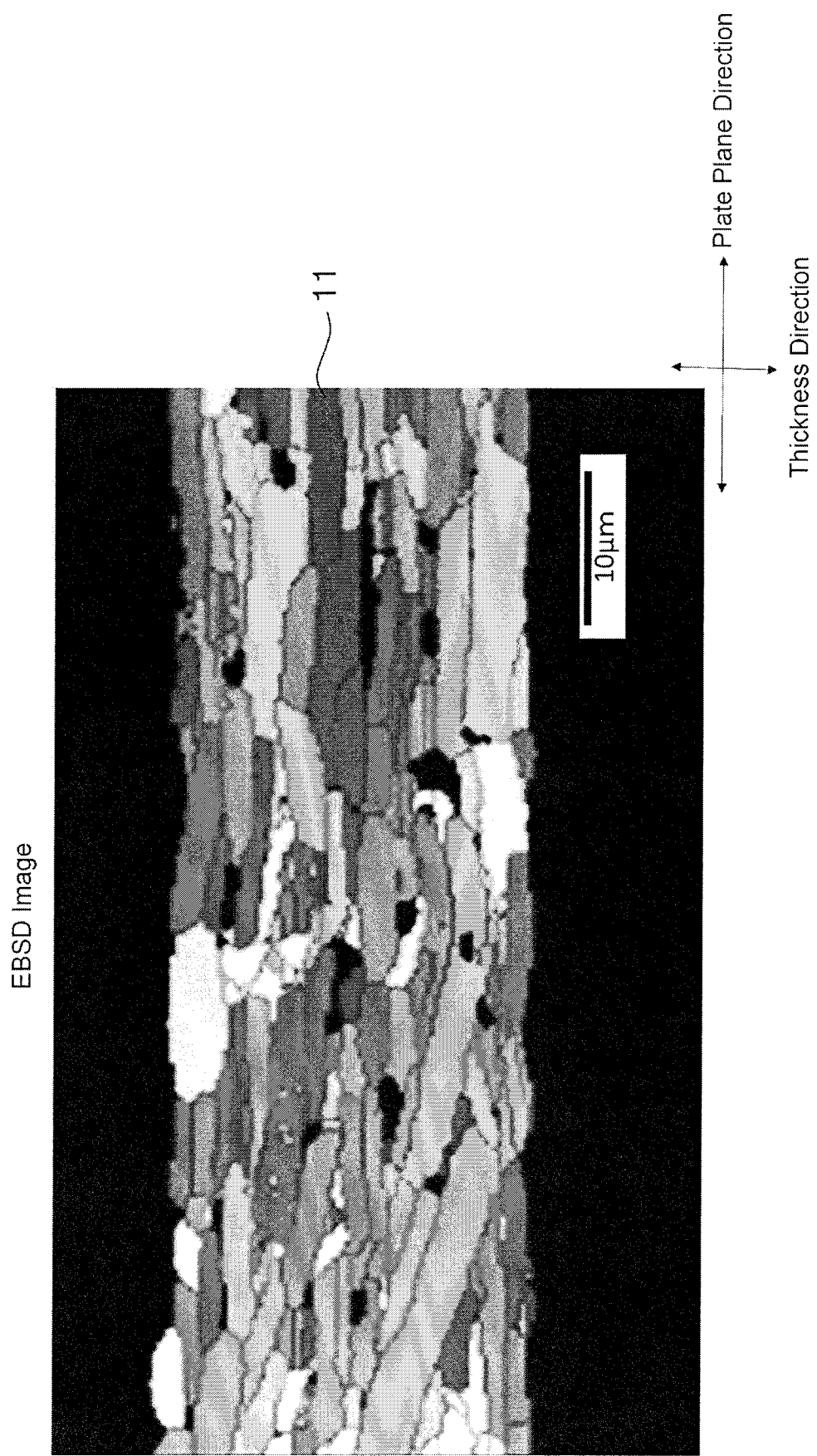
FIG. 3 is an EBSD image in the cross-section of the oriented positive electrode plate shown in FIG. 2.
Figure 4:
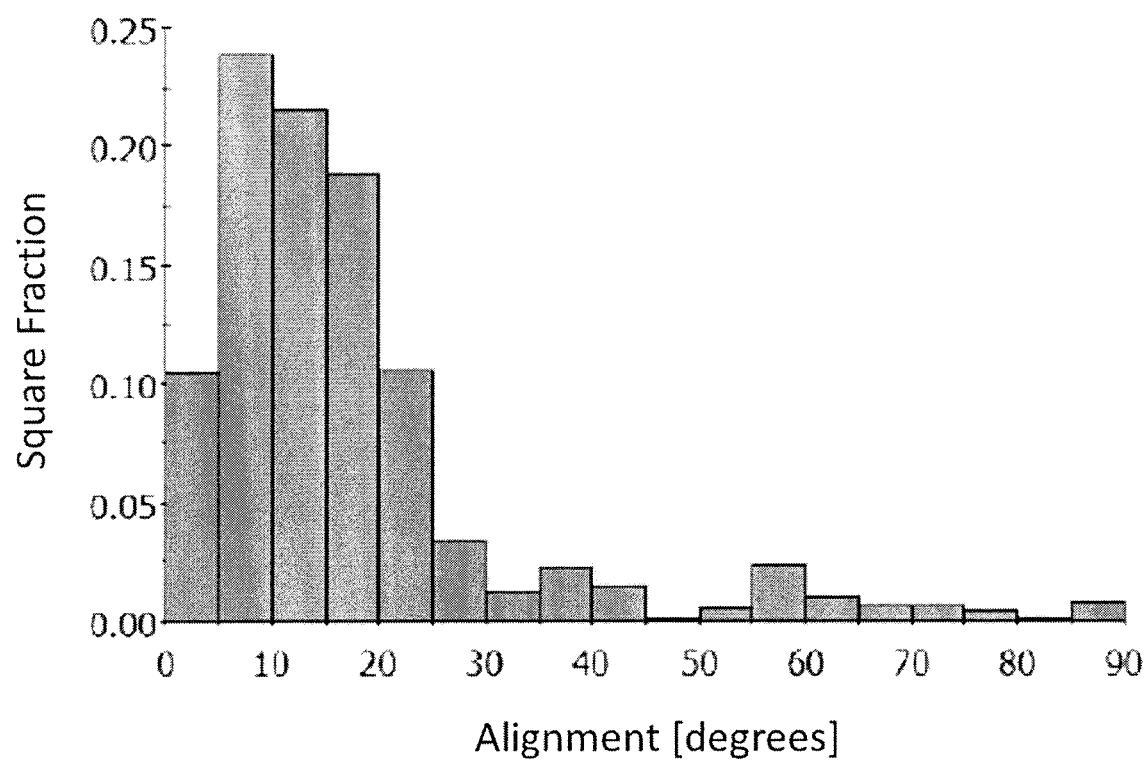
FIG. 4 is an area-based histogram illustrating the distribution of orientation angles of primary grains in the EBSD image shown in FIG. 3.

In the positive electrode plate 12 that is a lithium complex oxide sintered plate, the positive electrode plate 12 is preferably an oriented positive electrode plate that includes a plurality of primary grains composed of lithium complex oxide, the primary grains being oriented at a mean orientation angle of more than 0° to 30° to a main face of the positive electrode plate. Such an oriented positive electrode plate can be manufactured in accordance with the method disclosed in PTL 3 (WO2017/146088). FIG. 2 illustrates an exemplary cross-sectional SEM image perpendicular to a main face of the oriented positive electrode plate, and FIG. 3 illustrates a cross-sectional electron backscatter diffraction (EBSD) image perpendicular to a main face of the oriented positive electrode plate. FIG. 4 is an area-based histogram illustrating the distribution of orientation angles of primary grains 11 in the EBSD image of FIG. 3. In the EBSD image shown in FIG. 3, discontinuity of the crystal orientation can be observed. In FIG. 3, the orientation angle of each primary grain 11 is determined by the shade of color, and a darker shade indicates a smaller orientation angle. The orientation angle is a tilt angle between the (003) plane of each primary grain 11 and a main face of the plate. In FIGS. 2 and 3, black portions inside the oriented positive electrode plate 12 indicate pores.

As shown in FIGS. 2 and 3, the positive electrode plate 12 is preferably an oriented sintered plate composed of a plurality of primary grains 11 bonded to each other. Each primary grain 11 is mainly in a platy shape, and may be formed in, for example, a cuboid shape, a cubic shape, and a spherical shape. The cross-sectional shape of each primary grain 11 may be a rectangle, a polygon other than a rectangle, a circle, an ellipse, or any other complicated shape.

As shown in FIGS. 2 and 3, the averaged value of the orientation angles, i.e., the mean orientation angle of primary grains 11 composed of lithium complex oxide is preferably more than 0° to 30°. This angle range can further reduce the deterioration of battery in operating at high temperature, and provides the following advantages 1) to 3). 1) Since each primary grain 11 greatly tilts from the thickness direction of the positive electrode plate, the adhesiveness between the individual primary grains can be improved. This configuration can improve the ion conductivity between one primary grain 11 and another primary grain 11 adjacent on two ends of the one primary grain 11 in the longitudinal direction, resulting in an improvement in highrate performance. 2) Cycle characteristics can be improved. In detail, the expansion and contraction of the oriented positive plate 12 accompanied by the expansion and contraction of each primary grain 11 in the direction perpendicular to the (003) plane depending on intercalation and deintercalation of lithium ions can be decreased in the main face direction by smaller orientation angle of the (003) plane to the main face direction of the main face, resulting in a reduction in stress generated between the oriented positive plate 12 and the inorganic solid electrolyte 14. 3) The high-rate performance can be further improved. This further improvement is caused by smooth intercalation and deintercalation of lithium ions in the oriented positive electrode 12, because the expansion and contraction of oriented positive electrode plate 12 proceeds more dominantly in the thickness direction than in the main face direction of the main face and thereby carrier ions (e.g., lithium ions) can intercalate and deintercalate smoothly.

The mean orientation angle of primary grains 11 composed of lithium complex oxide is determined through (i) polishing of the positive electrode plate with a cross section polisher (CP), (ii) EBSD analysis of the resultant cross-section of oriented positive electrode plate at a specific magnification (e.g., 1000 folds) and a specific field of view (e.g., 125 μm by 125 μm), (iii) measurement of angles between the (003) plane of primary grains and a main face of positive electrode plate (i.e., tilt of crystal orientation from the (003) plane) as orientation angles based on all grains specified in the resultant EBSD image, and (iv) averaging of all the resulting angles to be a mean orientation angle. The mean orientation angle of the primary grains 11 is preferably 30° or less, and more preferably 25° or less from the viewpoint of a further improvement in high-rate performance. The mean orientation angle of the primary grains 11 is preferably 2° or more, and more preferably 5° or more from the viewpoint of a further improvement in high-rate performance.

As shown in FIG. 4, the orientation angle of each primary grain 11 composed of lithium complex oxide may be widely distributed from 0° to 90°, and most of the orientation angles are preferably distributed in a region of more than 0° to 30°. In other words, when the cross-section of the oriented sintered plate constituting the oriented positive electrode plate 12 is analyzed in the EBSD image, the total area of primary grains 11 that have the orientation angle of more than 0° to 30° to a main face of the oriented positive electrode plate 12 (hereinafter, referred to as low-angle primary grains) is preferably 70% or more, and more preferably 80% or more of the total area of the primary grains 11 included in the cross-section (specifically, 30 primary grains 11 used in calculation of the mean orientation angle). This configuration can increase the proportion of the primary grains 11 having higher mutual adhesiveness, thereby high-rate performance can be further improved. In addition, the total area of the low-angle primary grains having an orientation angle of 20° or less is more preferably 50% or more of the total area of the 30 primary grains 11 used in the calculation of the mean orientation angle. Furthermore, the total area of the low-angle primary grains having an orientation angle of 10° or less is more preferably 15% or more of the total area of the 30 primary grains 11 used in the calculation of the mean orientation angle.

Since each primary grain 11 composed of lithium complex oxide is mainly platy, the cross-section of each primary grain 11 respectively extends in a predetermined direction as shown in FIGS. 2 and 3, and typically has a substantially rectangular shape. In other words, when the cross-section of the oriented sintered plate is analyzed in the EBSD image, the total area of primary grains 11 that have an aspect ratio of 4 or more among the primary grains 11 included in the analyzed cross-section is preferably 70% or more, and more preferably 80% or more of the total area of the primary grains 11 included in the cross-section (specifically, 30 primary grains 11 used in calculation of the mean orientation angle). In detail, the configuration shown in the EBSD image of FIG. 3 can increase the mutual adhesiveness between the primary grains 11, resulting in a further improvement of high-rate performance. The aspect ratio of the primary grains 11 is a value determined by dividing the maximum Feret diameter by the minimum Feret diameter of the primary grains 11. The maximum Feret diameter is the maximum distance between two parallel straight lines by which the primary grains 11 are sandwiched in the EBSD image from cross-sectional observation. The minimum Feret diameter is the minimum distance between two parallel straight lines by which the primary grains 11 are sandwiched.

In the case that the pores of the positive electrode plate 12 are not filled with the inorganic solid electrolyte, a plurality of primary grains constituting the oriented sintered plate has a mean grain diameter of 5 μm or more. Specifically, 30 primary grains 11 used in calculation of the mean orientation angle have a mean grain diameter of preferably 5 µm or more, more preferably 7 µm or more, further more preferably 12 µm or more. This diameter range can reduce the number of grain boundaries between the primary grains 11 in the direction where lithium ions conduct, resulting in an improvement in the overall ion conductivity and thereby a further enhancement in high-rate performance. The mean grain diameter of the primary grains 11 is a value determined by the arithmetic average of the equivalent circle diameters of the respective primary grains 11. The equivalent circle diameter indicates the diameter of a circle having an identical area as each primary grain 11 in the EBSD image.

In the case that the pores of the positive electrode plate 12 are filled with the inorganic solid electrolyte, a plurality of primary grains constituting the oriented sintered plate has a mean grain diameter of 20 µm or less. Specifically, the primary grains 11 has a mean grain diameter of preferably 20 µm or less, more preferably 15 µm or less. Such a diameter range can reduce the distance for lithium ions to travel in the primary grains 11, resulting in a further improvement in high-rate performance. For example, in a charge state, the lithium ions move from the inside of primary grains 11 to the solid electrolyte filled in the pores of the positive electrode, further pass through the film-shaped (or planar) solid electrolyte 14 and move into the grains of negative electrode as a counter electrode. In this mechanism, since the traveling distance of lithium ions can be reduced in the positive electrode including the primary grains 11 where the solid electrolyte in the pores serve as a delaying factor, and thereby high-rate performance can be improved. The mean grain diameter of primary grains 11 can be measured by analysis of a cross-sectional SEM image of the sintered plate. For example, the sintered plate is processed with a cross section polisher (CP) to expose a polished cross-section. The polished cross-section is observed by SEM (scanning electron microscopy) at a specific magnification (e.g., 1000 folds) and a specific field of view (e.g., 125 µm by 125 µm). In this case, the field of view is selected such that 20 or more primary grains are located in this field. In the resultant SEM image, circumscribed circles are drawn for all primary grains and the diameters of circumscribed circles are measured and averaged to be a mean grain diameter of primary grains.

The positive electrode plate 12 preferably includes pores. The pores included in the positive electrode plate 12 can satisfactorily (or uniformly) relax the stress generated by expansion and contraction of crystal lattices accompanied by intercalation and deintercalation of carrier ions (e.g., lithium ions) during charge/discharge cycles. This stress relaxation can effectively reduce the cracking at the grain boundaries accompanied by the repeated charge/discharge cycles. A plurality of pores included in the positive electrode plate 12 is preferably oriented from the viewpoint of a further enhancement in the above advantages. The orientation of the pores can be achieved, for example, by the use of raw grains having platy crystals. In particular, the above advantages can be remarkably enhanced in high-rate charge/discharge cycles at a high temperature.

The positive electrode plate 12 has a mean pore aspect ratio of at least 1.2, preferably at least 1.5, further preferably at least 1.8. It is conceivable that the anisotropy in the pore shape defined by such an aspect ratio can advantageously release the flexure stress and the stress occurring in charge/discharge cycles, resulting in superior performances, such as high bending resistance and rapid charge characteristics. The mean pore aspect ratio may have any upper limit. The mean pore aspect ratio is preferably 30 or lower, more preferably 20 or lower, and further more preferably 15 or lower. The mean pore aspect ratio in the positive electrode plate 12 indicates the averaged value of the aspect ratios of the pores in the positive electrode plate 12, and the aspect ratio of the pores is defined by the ratio of the length of pores in the longitudinal direction to the length of pores in the lateral direction. The mean pore aspect ratio can be determined by the analysis of a cross-sectional SEM image of the positive electrode plate 12, as will be explained in detail in Examples described later.

The positive electrode plate 12 has a porosity of preferably 2 to 20%, more preferably 3 to 20%, further more preferably 5 to 18%. Such a porosity range can desirably achieve both advantages of stress relaxation due to the pores and increased battery capacity. The porosity in the positive electrode plate 12 is a volume rate of pores (including open pores and closed pores) in the positive electrode plate 12, and can be determined by the analysis of a cross-sectional SEM image of the positive electrode plate 12, as will be explained in detail in Examples described later.

Alternatively, the positive electrode plate 12 has a porosity of preferably 10 to 50%, more preferably 10 to 40%, further more preferably 12 to 35%. Such a porosity range is advantageous in filling the pores included in the positive electrode plate 12 with the inorganic solid electrolyte. A more compact positive electrode plate leads to slower diffusion of lithium in the positive electrode plate, and thereby the discharge capacity that the positive electrode plate can inherently provide cannot be achieved. However, in the battery in which a porous positive electrode plate is used and the pores are filled with an inorganic solid electrolyte, the electrolyte can assist the diffusion of lithium in the positive electrode plate, resulting in an increase in discharge capacity. Accordingly, the inorganic solid electrolyte occupies preferably part of the pores, more preferably at least 70% of the pores, further more preferably at least 85% of the pores in the positive electrode plate 12. A higher filling rate of the inorganic solid electrolyte in the pores of the positive electrode plate 12 is preferred. Although the rate is ideally 100%, it is practically 99% or lower. In addition, the positive electrode plate 12 preferably consists of the inorganic solid electrolyte and the positive electrode active material. In other words, the addition of an electron conductive aid in the positive electrode plate leads to a decrease in the weight of active material and the battery capacity. In contrast, the use of the sintered plate in the positive electrode plate requires no electron conductive aid and can ensure desirable electron conductivity only by the positive electrode active material. This improvement in electron conductivity is caused by strong connection through necking between the grains constituting the sintered plate (i.e., grains of positive electrode active material). Furthermore, the use of the sintered plate can appropriately decrease the pores in the positive electrode plate (i.e., the pores lead to a reduction in capacity), and thereby increase the energy density of the battery.

The positive electrode plate 12 has a thickness of at least 25 µm, preferably at least 30 µm, more preferably at least 40 µm, particularly more preferably at least 50 µm, most preferably at least 55 µm from the viewpoint of an increase in the active material capacity per unit area and an improvement in the energy density of lithium secondary battery 10. The upper limit of the thickness is not particularly limited. The positive electrode plate 12 has a thickness of preferably less than 500 µm, more preferably 400 µm or less, further more preferably 300 µm or less, particularly preferably 250 µm or less, particularly more preferably 200 µm or less from the viewpoint of delayed deterioration in battery characteristics (in particular, an increase in resistance value) accompanied by charge/discharge cycles. The positive electrode plate 12 has dimensions of preferably 5 mm by 5 mm or more, more preferably 10 mm by 10 mm or more, and in another expression, an area of preferably 25 mm$^2$ or more, more preferably 100 mm$^2$ or more.

The negative electrode plate 16 is composed of an inorganic material that contains a negative electrode active material in an oxide form. The negative electrode active material in an oxide form may be selected depending on the type of secondary battery 10, and may be any oxide material but preferably an oxide material containing at least Ti. In the case of secondary lithium batteries, preferred examples of such a negative electrode active material include lithium titanate $Li_4Ti_5O_{12}$ (hereinafter referred to as "LTO"), niobium titanium complex oxide $Nb_2TiO_7$, and titanium oxide $TiO_2$. More preferred examples of the negative electrode active material include LTO and $Nb_2TiO_7$. Typical LTO is known to have a spinel structure. Alternatively, LTO may have a different structure during the charge/discharge cycles of the battery. For example, LTO may have two phases consisting of $Li_4Ti_5O_{12}$ having a spinel structure and $Li_7Ti_5O_{12}$ having a rock-salt structure during the charge/discharge cycles, and the reaction continues between the two phases. Thus, LTO may have any structure other than the spinel structure.

It is preferred that a plurality of grains of the negative electrode active material contained in the negative electrode plate 16 be physically and electrically connected to each other from the viewpoint of an improvement in electron conductivity and ion conductivity as well as an increased energy density. Accordingly, the negative electrode plate 16 is preferably composed of a sintered plate containing, for example, LTO or $Nb_2TiO_7$. Since the negative electrode plate composed of a sintered plate contains no binder, high capacity and satisfactory charge/discharge efficiency can be achieved due to a high packing density of the negative electrode active material, for example, LTO or $Nb_2TiO_7$. The binder in the green sheet will eventually disappear or burn off while the green sheet is fired into the negative electrode plate. The LTO sintered plate can be produced by a process disclosed in PTL 2 (JP2015-185337A).

The negative electrode plate 16 preferably includes pores. The pores included in the negative electrode plate 16 can satisfactorily (or uniformly) relax the stress occurring in expansion and contraction of crystal lattices accompanied by intercalation and deintercalation of carrier ions (e.g., lithium ions) in charge/discharge cycles. This stress relaxation can effectively reduce the cracking at the grain boundaries accompanied by the repeated charge/discharge cycles.

The negative electrode plate 16 has a porosity of preferably 2 to 20%, more preferably 3 to 20%, further more preferably 5 to 18%. Such a porosity range can desirably achieve both advantages of stress relaxation due to the pores and increased battery capacity. The porosity in the negative electrode plate 16 is a volume rate of pores (including open pores and closed pores) in the negative electrode plate 16, and can be determined by the analysis of a cross-sectional SEM image of the negative electrode plate 16, as will be explained in detail in Examples described later.

Alternatively, the negative electrode plate 16 has a porosity of preferably 10 to 50%, more preferably 10 to 40%, further more preferably 12 to 35%. This porosity range is advantageous in filling the pores contained in the negative electrode plate 16 with the inorganic solid electrolyte. A more compact negative electrode plate leads to slower diffusion of lithium in the negative electrode plate, and thereby the discharge capacity that the negative electrode plate can inherently have cannot be achieved. In contrast, in the battery including the negative electrode plate having the pores that are filled with an inorganic solid electrolyte, the electrolyte facilitates the diffusion of lithium, resulting in an enhancement in the resultant discharge capacity. Accordingly, the pores contained in the negative electrode plate 16 are preferably filled with the inorganic solid electrolyte. The inorganic solid electrolyte occupies into more preferably at least 70%, further more preferably at least 85% of the pores contained in the negative electrode plate 16. A higher filling rate of the inorganic solid electrolyte into the pores of the negative electrode plate 16 is preferred. Although the rate is ideally 100%, it is practically 99% or lower. In addition, the negative electrode plate 16 preferably consists of the inorganic solid electrolyte and the negative electrode active material. In other words, the addition of the electron conductive aid in the negative electrode plate leads to a decrease in the weight of active material and the battery capacity. In contrast, the use of the sintered plate in the negative electrode plate requires no electron conductive aid, in other words, only the inorganic solid electrolyte and the active material can achieve desirable electron conductivity. This improvement in electron conductivity is caused by strong connection through necking between the grains constituting the sintered plate (i.e., grains of negative electrode active material). Furthermore, the use of the sintered plate can appropriately decrease the pores in the negative electrode plate (i.e., the pores lead to a reduction in capacity), and increase the energy density of the battery depending on the rate of decrease in pores.

The negative electrode plate 16 has a thickness of 25 μm or more, preferably 30 μm or more, more preferably 40 μm or more, particularly preferably 50 μm or more, mostly preferably 55 μm or more from the viewpoint of an increase in the active material capacity per unit area and an increase in energy density of the secondary lithium battery 10. The thickness of the negative electrode plate 16 may have any upper limit. The negative electrode plate 16 has a thickness of preferably 400 μm or less, more preferably 300 μm or less from the viewpoint of the avoidance in the deterioration of the battery properties accompanied by repeated charge/discharge cycles (particularly, due to an increase in electric resistance). In addition, the negative electrode plate 16 has dimensions of preferably 5 mm by 5 mm or more, more preferably 10 mm by 10 mm or more. In another expression, the negative electrode plate 16 has an area of preferably at least 25 mm$^2$, more preferably at least 100 mm$^2$.

The ratio C/A, i.e., the ratio of the capacity C of the positive electrode plate 12 to the capacity A of the negative electrode plate 16, preferably satisfies 1.0<C/A<1.6, more preferably 1.005<C/A<1.500. Since the capacity C of the positive electrode plate 12 is larger than the capacity A of the negative electrode plate 16 as shown in the above formula, the secondary battery 10 is operated based on the capacity of the negative electrode plate 16, resulting in a reduction in the rate of carrier metal (e.g., lithium metal) used in the positive electrode plate 12 and a decrease in the level of expansion and contraction of the positive electrode plate 12 accompanied by intercalation and deintercalation of carrier ions (e.g., lithium ions). In particular, the above advantages are remarkably observed under high temperature conditions. Although no cause of such advantages is clear, a plausible cause is as follows: Since the diffusion of carriers is fast inside both the positive electrode plate 12 and the negative electrode plate 16, the difference in carrier concentration (which leads to the difference in expansion and contraction) does not increase.

The C/A ratio within the above range can be achieved by appropriately controlling several characteristics, such as thickness and porosity, in the positive electrode plate 12, and several characteristics, such as thickness and porosity, in the negative electrode plate 16. The C/A ratio is preferably determined in accordance with the following procedures:

(i) A practical electric capacity (mAh) for an area of 1 cm$^2$ of the positive electrode plate 12 is determined at 25° C. to be the capacity C of the positive electrode plate 12. The practical electric capacity is measured by the charge at a constant current of 0.2 C until the potential relative to lithium metal reaches 4.25 V and then at a constant voltage for 10 hours followed by the discharge at a constant current of 0.2 C until the potential relative to lithium metal reaches 3.0 V.

(ii) A practical electric capacity (mAh) for an area of 1 cm$^2$ of the negative electrode plate 16 is determined at 25° C. to be the capacity A of the negative electrode plate 16. The practical electric capacity is measured by the charge at a constant current of 0.2 C until the potential relative to lithium metal reaches 0.8 V and then at a constant voltage for 10 hours followed by the discharge at a constant current of 0.2 C until the potential relative to lithium metal reaches 2.0 V.

(iii) The C/A ratio of the capacity C of the positive electrode plate 12 to the capacity A of the negative electrode plate 16 is calculated.

As described above, the positive electrode plate 12 is preferably a LiCoO$_2$ (LCO) sintered plate, and the negative electrode plate 16 is preferably a Li$_4$Ti$_5$O$_{12}$ (LTO) sintered plate. In particular, an averaged value of the orientation angles, i.e., a mean orientation angle of more than 0° to 30° in the LCO positive electrode plate causes no expansion and contraction to occur in the main face direction during charge/discharge cycles, and the LTO negative electrode plate and the solid electrolyte also do not expand and contract during the charge/discharge cycles, resulting in no stress generation (in particular, the stress at the interface between the positive electrode plate 12 or negative electrode plate 16 and the inorganic solid electrolyte layer 14), and stable and rapid charge/discharge in high capacity. In the use of Nb$_2$TiO$_7$ sintered plate as the negative electrode plate 16, primary grains constituting the Nb$_2$TiO$_7$ sintered plate are preferably oriented to reduce the expansion and contraction.

The inorganic solid electrolyte layer 14 may be any layer that contains the inorganic solid electrolyte and appropriately selected depending on the type of secondary battery 10. For example, the inorganic solid electrolyte is desirably a lithium-ion-conductive material in a secondary lithium battery. Preferred examples of the lithium-ion-conductive materials that can constitute the inorganic solid electrolyte layer 14 include garnet ceramic materials, nitride ceramic materials, perovskite ceramic materials, phosphate ceramic materials, sulfide ceramic materials, borosilicate ceramic materials, lithium halide materials, and polymer materials. More preferred examples include at least one selected from the group consisting of garnet ceramic materials, nitride ceramic materials, perovskite ceramic materials, and phosphate ceramic materials. Examples of the garnet ceramic materials include Li—La—Zr—O materials (specifically, such as Li$_7$La$_3$Zr$_2$O$_{12}$) and Li—La—Ta—O materials (specifically, such as Li$_7$La$_3$Ta$_2$O$_{12}$). Example of nitride ceramic materials include Li$_3$N. Examples of the perovskite ceramic materials include Li—La—Zr—O materials (specifically, such as LiLa$_{1-x}$Ti$_x$O$_3$ (0.04≤x≤0.14)). Examples of the phosphate ceramic materials include lithium phosphate, nitrogen-substituted lithium phosphate (LiPON), Li—Al—Ti—P—O, Li—Al—Ge—P—O, and Li—Al—Ti—Si—P—O (specifically, such as Li$_{1+x+y}$Al$_x$Ti$_{2-x}$Si$_y$P$_{3-y}$O$_{12}$ (0≤x≤0.4, 0≤y≤0.6)). Examples of the sulfide ceramic materials include LiOH—Li$_2$SO$_4$ and Li$_3$BO$_3$—Li$_2$SO$_4$—Li$_2$CO$_3$. Examples of the borosilicate ceramic materials include Li$_2$O—B$_2$O$_3$—SiO$_2$. Examples of the lithium halide materials include Li$_3$OX (where X is Cl and/or Br), Li$_2$(OH)$_{1-a}$F$_a$Cl (where 0≤a≤0.3), and Li$_2$OHX (where X is Cl and/or Br), and particularly preferred is Li$_3$OCl.

The inorganic solid electrolyte preferably has a melting point lower than the melting point or pyrolytic temperature of the positive electrode plate 12 or the negative electrode plate 16. This melting point in the electrolyte is advantageous in filling the pores in the positive electrode plate 12 and/or the negative electrode plate 16 with the inorganic solid electrolyte, as described above. The inorganic solid electrolyte has a melting point that is, typically higher than the battery operational temperature, more typically above the battery operational temperature to 600° C. Based on this low melting point, the inorganic solid electrolyte can melt at a temperature of 100 to 600° C. and permeate into the pores of the positive electrode plate 12 and/or the pores of the negative electrode plate 16 as described later, resulting in strong interfacial contact. In this case, the solid electrolyte preferably contains a lithium halide material. Examples of the lithium halide materials include, preferably at least one selected from the group consisting of Li$_3$OCl, Li$_{(3-x)}$M$_{x/2}$OA (where 0≤x≤0.8, M is at least one selected from the group consisting of Mg, Ca, Ba and Sr, and A is at least one selected from the group consisting of F, Cl, Br and I), Li$_2$(OH)$_{1-a}$F$_a$Cl (where 0≤a≤0.3), and Li$_2$OHX (where X is Cl and/or Br), and more preferably Li$_3$OCl or Li$_2$(OH)$_{0.9}$F$_{0.1}$Cl. Another preferred example of the solid electrolyte 14 includes a lithium halide material that has a formula Li$_a$(OH)$_b$F$_c$Br (where 1.8≤a≤2.3, b=a−c−1, and 0.01≤c≤0.11) and an antiperovskite crystal phase, for example, Li$_2$(OH)$_{0.9}$F$_{0.1}$Br. Alternatively, the solid electrolyte 14 may be a material other than the lithium halide material, for example, that has a formula xLiOH.yLi$_2$SO$_4$ (where x+y=1, and 0.6≤x≤0.95), such as 3LiOH.Li$_2$SO$_4$. Each material as described above is advantageous in high ion conductivity.

In addition, a lithium phosphate oxynitride (LiPON) ceramic materials are also preferred. The LiPON is a group of compounds represented by, for example, a formula Li$_a$PO$_b$N$_c$ (where a is 2 to 4, b is 3 to 5, and c is 0.1 to 0.9), particularly a formula Li$_{2.9}$PO$_{3.3}$NO$_{0.46}$.

The inorganic solid electrolyte layer 14 can be produced by any process. Suitable examples of such processes include vapor phase deposition, such as sputtering and CVD; liquid phase deposition, such as screen printing and spin coating; compression of powder; heating of a raw material to a temperature above the melting point and then solidification of the melt; and heating of compressed raw powder to a temperature above the melting point and then solidification of the melt.

The solid electrolyte 14 may have any dimension. The solid electrolyte has a thickness of preferably 0.0005 mm to 1.0 mm, more preferably 0.001 mm to 0.1 mm, further more preferably 0.002 to 0.05 mm from the viewpoint of high-rate performance during charge/discharge cycles and mechanical strength. The thickness of the solid electrolyte layer may be controlled by a layering process, or with spacers in the case of heating of compressed raw powder to a temperature above the melting point and then solidification of the melt. In other words, the all-solid lithium battery preferably includes spacers for defining the thickness of the solid electrolyte layer 14 between the oriented positive electrode plate 12 and the negative electrode plate 16. The spacers have an electrical resistivity of preferably $1\times10^5$ Ω·cm or more, and more preferably $1\times10^7$ Ω·cm or more. The spacers are composed of any material, preferably composed of ceramic, such as $Al_2O_3$, MgO, and $ZrO_2$.

The thickness Te of the inorganic solid electrolyte layer, the thickness Tc of the positive electrode plate, and the thickness Ta of the negative electrode plate satisfy preferably Te/(Tc+Ta)<0.25, more preferably 0.002<Te/(Tc+Ta)<0.25, further more preferably 0.005<Te/(Tc+Ta)<0.2. In such a thickness range, the inorganic solid electrolyte layer has a significantly small thickness Te compared to the total thickness Ta+Tc of the positive electrode plate and the negative electrode plate, resulting in a significantly high energy density of the secondary battery 10.

One face, remote from the solid electrolyte 14, of the positive electrode plate 12 is preferably provided with a positive electrode collector 13. In addition, the other face, remote from the solid electrolyte 14, of the negative electrode plate 16 is preferably provided with a negative electrode collector 17. Examples of the materials constituting the positive electrode collector 13 and the negative electrode collector 17 include platinum (Pt), platinum (Pt)/palladium (Pd), gold (Au), silver (Ag), aluminum (Al), copper (Cu), ITO (indium-tin oxide film), and nickel (Ni).

The positive electrode plate 12, the inorganic solid electrolyte 14, and the negative electrode plate 16 are accommodated in a container 26. The container 26 may be of any type that can accommodate a unit cell or a laminated battery including a stack of multiple unit cells electrically connected in series or in parallel. In particular, since a secondary battery 10 has no risk of electrolyte leakage, the container 26 may be of a relatively simple type, and the cell or battery may be packaged with a cover material. For example, the cell or battery can be manufactured in a chip form for mounting on an electronic circuit or in a laminate cell form (e.g., a multilayer product of aluminum (Al)/polypropylene (PP)) for low-profile and broad space applications. The positive electrode collector 13 and/or the negative electrode collector 17 may have a structure that can serve as a part of the container 26. In order to further increase the heat resistance, a heat-resistant resin, such as polychlorotrifluoroethylene (PCTFE), tetrafluoroethylene-perfluoroalkylvinyl ether copolymer (PFA), polyimide, and polyamide, may be used in place of polypropylene, and a metal, such as aluminum or stainless steel, may also be used after ensuring insulation between the cover material and the collector.

Production of Secondary Battery

The inventive secondary battery 10 is preferably produced as follows: Inorganic solid electrolyte powder having a melting point lower than the melting point or pyrolytic temperature of the positive electrode plate 12 (or the negative electrode plate 16) is placed on the positive electrode plate 12 (or the negative electrode plate 16). The negative electrode plate 16 (or the positive electrode plate 12) is placed on the inorganic solid electrolyte powder. The negative electrode plate 16 is pressed toward the positive electrode plate 12 (or the positive electrode plate is pressed toward the negative electrode plate) at 100 to 600° C., preferably 200 to 500° C., more preferably 250 to 450° C. to melt the solid electrolyte powder and permeate the melt into the pores in the positive electrode plate. This press treatment is performed by any process that can generate a load, for example, a mechanical load or weight. Subsequently, the positive electrode plate 12, the molten electrolyte, and the negative electrode plate 16 are spontaneously or controllably cooled to solidify the molten electrolyte into the solid electrolyte 14. Preferred examples of the inorganic solid electrolyte powder having a melting point lower than the melting point or pyrolytic temperature of the positive electrode plate 12 (or the negative electrode plate 16) include powder containing at least one selected from the group consisting of $xLiOH \cdot yLi_2SO_4$, $Li_3OCl$, $Li_{(3-x)}M_{x/2}OA$, $Li_2(OH)_{1-a}F_aCl$, $Li_2OHX$, and $Li_a(OH)_bF_cBr$.

As described above, the all-solid lithium battery 10 may include spacers that define the thickness of the solid electrolyte layer 14 between the positive electrode plate 12 and the negative electrode plate 16. This configuration is preferably achieved by disposing spacers along with the solid electrolyte powder between the oriented positive electrode plate 12 and the negative electrode plate 16.

EXAMPLES

The present invention will be described in more detail by the following examples. In the following examples, $LiCoO_2$ is abbreviated as "LCO" and $Li_4Ti_5O_{12}$ is abbreviated as "LTO".

Examples A1 to A5

(1) Production of Positive Electrode Plate
(1a) Preparation of LCO Green Sheet $Co_3O_4$ powder (available from Seido Chemical Co., Ltd., a mean particle size of 0.9 μm) and $Li_2CO_3$ powder (available from The Honjo Chemical Corporation) were weighed into a Li/Co molar ratio of 1.02, mixed, and then heated at 750° C. for five hours. The resultant powder was pulverized in a pot mill into a volume-based D50 of 0.4 μm to give LCO powder composed of platy particles. The resultant LCO powder (100 parts by weight), a dispersive medium (toluene:2-propanol=1:1) (100 parts by weight), a binder (poly (vinyl butyral): Product No. BM-2, available from Sekisui Chemical Co., Ltd.) (10 parts by weight), a plasticizer (di-2-ethylhexyl phthalate (DOP), available from Kurogane Kasei Co., Ltd.) (4 parts by weight), and a dispersant (product name: RHEODOL SP-O30, available from Kao Corporation) (2 parts by weight) were mixed. The mixture was defoamed by stirring under reduced pressure to prepare an LCO slurry with a viscosity of 4000 cP. The viscosity was measured with an LVT viscometer available from Brookfield. The slurry was molded into an LCO green sheet onto a PET film by a doctor blade process. The thickness of the LCO green sheet was adjusted such that the fired thickness was 25 μm (Example A1) or 200 μm (Examples A2 to A5 and A7).

(1b) Preparation of $Li_2CO_3$ Green Sheet (Excess-Lithium Source)

$Li_2CO_3$ raw material powder (volume-based particle diameter D50: 2.5 μm, available from The Honjo Chemical Corporation) (100 parts by weight), a binder (poly(vinyl butyral): Product No. BM-2, available from Sekisui Chemical Co., Ltd.) (5 parts by weight), a plasticizer (di-2-ethylhexyl phthalate (DOP), available from Kurogane Kasei Co., Ltd.) (2 parts by weight), and a dispersant (RHEODOL SP-O30, available from Kao Corporation) (2 parts by weight) were mixed. The mixture was defoamed by stirring under reduced pressure to prepare a $Li_2CO_3$ slurry with a viscosity of 4000 cP. The viscosity was measured with an LVT viscometer available from Brookfield. The $Li_2CO_3$ slurry was molded into a $Li_2CO_3$ green sheet on a PET film by a doctor blade process. The dried thickness of the $Li_2CO_3$ green sheet was adjusted such that the Li/Co molar ratio of the Li content in the $Li_2CO_3$ green sheet to the Co content in the LCO green sheet is a predetermined value.

(1c) Preparation of Sintered LCO Plate

The LCO green sheet was separated from the PET film, and was cut into a 50 mm square. The cut piece was placed on the center of a bottom magnesia setter (dimensions: 90 mm square, height: 1 mm). The LCO green sheet was heated to 600° C. at a heating rate of 200° C./h, and was degreased for three hours. The LCO green sheet was then kept at 900° C. for three hours to calcine the LCO green sheet. The dried $Li_2CO_3$ green sheet was cut into a size such that the Li/Co molar ratio of the Li content in the $Li_2CO_3$ green sheet to the Co content in the calcined LCO plate was 0.5. The cut piece of the $Li_2CO_3$ green sheet, as an excess-lithium source, was placed on the calcined LCO plate, and a porous top magnesia setter was placed thereon. The calcined LCO plate and the green sheet piece disposed between the top and bottom setters were placed into an alumina sheath of a 120 mm square (available from Nikkato Co., Ltd.). At this time, the alumina sheath was not tightly sealed, and was covered with a lid with a gap of 0.5 mm. The laminate was heated to 600° C. at a heating rate of 200° C./h, and was degreased for three hours. The laminate was then heated to 800° C. at 200° C./h, and was kept for five hours. The laminate was then heated to 900° C. at 200° C./h, and was kept for 24 hours to be fired. After the firing, the fired laminate was cooled to room temperature, and was removed from the alumina sheath. Thus, the sintered LCO plate was yielded as a positive electrode plate. An Au film (a thickness of 100 nm) was deposited by sputtering on a face, in contact with the bottom setter, of the sintered LCO plate, and the LCO positive electrode plate was then cut into a 10 mm by 10 mm by a laser process.

(2) Production of Negative Electrode Plate (2a) Preparation of LTO Green Sheet

LTO powder (a volume-based D50 particle size of 0.06 µm, available from Sigma-Aldrich Japan) (100 parts by weight), a dispersion medium (toluene: 2-propanol=1:1) (100 parts by weight), a binder (poly(vinyl butyral): product number BM-2, available from Sekisui Chemical Co., Ltd.) (20 parts by weight), a plasticizer (DOP: di(2-ethylhexyl) phthalate, available from Kurogane Kasei Co., Ltd.) (4 parts by weight), and a dispersant (product name: Rheodor SP-O30, available from Kao Corporation) (2 parts by weight) were mixed. The resultant mixture of raw materials for the negative electrode was stirred and defoamed under reduced pressure, and then the viscosity was adjusted to 4000 cP to prepare an LTO slurry. The viscosity was measured with an LVT viscometer available from Brookfield. The resulting slurry was applied onto a PET film by a doctor blade process into an LTO green sheet. The dried thickness of LTO green sheet was adjusted such that the fired thickness was 28 µm (Example A1), 224 µm (Examples A2 and A3), 257 µm (Example A4) or 161 µm (Example A5).

(2b) Firing of LTO Green Sheet

The resultant green sheet was cut into a 25 mm square with a box cutter and placed onto an embossed zirconia setter. The green sheet on the setter was placed into an alumina sheath and held at 500° C. for five hours, then heated at a rate of 200° C./h and fired at 800° C. for five hours. An Au film (a thickness of 100 nm) as a current collecting layer was deposited on a face, in contact with the setter, of the resultant LTO sintered plate by sputtering, and the LTO sintered plate was then cut into a 10 mm by 10 mm by a laser process.

(3) Production of Inorganic Solid Electrolyte

An aqueous raw material solution was prepared by dissolving of LiOH (4.790 g) and LiCl (4.239 g) into a small amount of deionized water. Each amount of these precursors was determined such that the stoichiometric ratio corresponded to the reactant formula: $Li_3OCl+H_2O$. Most of the water was removed with a rotary evaporator and a bath at about 90° C. The resulting solid was placed in an alumina boat. The boat was disposed in an electric furnace and heated in vacuum at about 280° C. for about 48 hours to give $Li_3OCl$ powder, which is a reaction product, as an inorganic solid electrolyte.

(4) Preparation of Battery

The $Li_3OCl$ powder was placed on the positive electrode plate; the positive electrode plate and the $Li_3OCl$ powder were heated at 400° C. on a hot plate; and the negative electrode plate was placed while being pressed from the top. At this time, the $Li_3OCl$ powder was melted followed by solidification, and a solid electrolyte layer having a thickness of 20 µm was thereby formed. The unit cell composed of the positive electrode plate, the solid electrolyte layer and the negative electrode plate was used to prepare a laminated battery.

(5) Evaluation

The following properties were evaluated on the LCO positive electrode plate synthesized in Procedure (1), the LTO negative electrode plate synthesized in Procedure (2), and the battery prepared in Procedure (4).

<Mean Orientation Angle of Primary Grains>

The sintered LCO plate was polished with a cross section polisher (CP) (IB-15000CP, available from JEOL Ltd.), and the resultant cross-section of the positive electrode plate (cross-section perpendicular to a main face of the positive electrode plate) was subjected to the EBSD measurement at a 1000-fold field of view (125 µm by 125 µm) to give an EBSD image. This EBSD measurement was performed using a Schottky field emission scanning electron microscope (model JSM-7800F, available JEOL Ltd.). For all grains identified in the resultant EBSD image, the angle defined by the (003) plane of the primary grain and the main face of the positive electrode plate (i.e., the tilt of the crystal orientation from the (003) plane) is determined as a tilt angle. The mean value of the angles was determined as a mean orientation angle (i.e., a mean tilt angle) of the primary grains.

<Thickness>

The LCO positive electrode plate and the LTO negative electrode plate were each polished with a cross section polisher (CP) (IB-15000CP, available from JEOL Ltd.), and the resultant cross-section of each electrode plate was observed with an SEM (JSM6390LA, available from JEOL Ltd.) to determine the thickness of each electrode plate.

<Porosity>

Each of the LCO positive electrode plate and the LTO negative electrode plate was polished with a cross section polisher (CP) (IB-15000CP, available from JEOL Ltd.), and the resultant cross-section of each electrode plates was observed with a SEM (JSM6390LA, available from JEOL Ltd.) at a 1000-fold field of view (125 µm by 125 µm). The image analysis was then performed, and the porosity (%) of each electrode plate was determined through dividing the area of all the pores by the total area of each plate and multiplying the resulting value by 100.

<Mean Pore Aspect Ratio>

The LCO positive electrode plate is polished with a cross section polisher (CP) (IB-15000CP, available from JEOL Ltd.), and the cross-section of the positive electrode plate was observed with an SEM (JSM6390LA, available from JEOL Ltd.) at a 1000-fold field of view (125 μm by 125 μm). The resultant SEM image was binarized using image analysis software, ImageJ, and pores were identified in the binary image. For each of the pores identified in the binary image, the aspect ratio was calculated through dividing the length in the longitudinal direction by the length in the lateral direction. The aspect ratios were calculated for all the pores in the binary image and averaged into a mean aspect ratio.

<C/A Ratio>

A practical electric capacity (mAh) for an area of 1 cm$^2$ of the positive electrode plate was determined at 25° C. to be the capacity C of the positive electrode plate. The practical electric capacity was measured through the charge at a constant current of 0.2 C until the potential relative to lithium metal reached 4.25 V and then at a constant voltage for 10 hours followed by the discharge at a constant current of 0.2 C until the potential relative to lithium metal reached 3.0 V. In a similar manner, a practical electric capacity (mAh) for an area of 1 cm$^2$ of the negative electrode plate was determined at 25° C. to be the capacity A of the negative electrode plate. The practical electric capacity is measured by the charge at a constant current of 0.2 C until the potential relative to lithium metal reached 0.8 V and then at a constant voltage for 10 hours followed by the discharge at a constant current of 0.2 C until the potential relative to lithium metal reached 2.0 V. A C/A ratio of the capacity C of the positive electrode plate to the capacity A of the negative electrode plate is calculated.

<Cycle Capacity Retention>

The cycle capacity retention of the battery was measured in a potential range of 2.7 V to 1.5 V at a battery operational temperature of 100° C. or 300° C. in accordance with the following procedures.

(i) The battery was charged at a rate of 1 C under a constant current until the battery voltage reached 2.7 V, was charged under a constant voltage until the current value reached a rate of 0.2 C, and was then discharged at a rate of 1 C until the voltage reached 1.5 V. This charge/discharge cycle was repeated three times in total to measure the discharge capacities. The averaged value was defined as an initial discharge capacity.

(ii) The battery was charged and discharged 100 times in total at a charge rate of 2 C and a discharge rate of 2 C, respectively.

(iii) The battery was charged at a rate of 1 C under a constant current until the battery voltage reached 2.7 V, was charged under a constant voltage until the current reached a rate of 0.2 C, and then was discharged at a rate of 1 C until the voltage reached 1.5 V. This charge/discharge cycle was repeated three times in total to measure the discharge capacities. The averaged value was defined as a post-cycle discharge capacity.

(iv) The ratio of the post-cycle discharge capacity measured in Procedure (iii) to the initial discharge capacity measured in Procedure (i) was calculated, and the ratio was multiplied by 100 to determine the capacity retention (%) after charge/discharge cycles.

Example A6

A battery was prepared and evaluated as in Example A2 except that the negative electrode plate was produced as follows. The results are shown in Table 1.

(Production of Negative Electrode Plate)

TiO$_2$ powder (CR-ER, available from Ishihara Sangyo Co., Ltd.) and Nb$_2$O$_5$ powder (ceramic grade, available from Mitsui Mining & Smelting Co., Ltd.) weighed into a molar ratio of 1:2 were mixed. The resultant mixed powder was heated at 1150° C. for five hours, and the reactant was then pulverized in a pot mill such that the volume-based D50 was 0.5 μm to give Nb$_2$TiO$_7$ powder. The resulting Nb$_2$TiO$_7$ powder (100 parts by weight), a dispersive medium (toluene:2-propanol=1:1) (100 parts by weight), a binder (poly(vinyl butyral): Product No. BM-2, available from Sekisui Chemical Co., Ltd.) (20 parts by weight), a plasticizer (di-2-ethylhexyl phthalate (DOP), available from Kurogane Kasei Co., Ltd.) (4 parts by weight), and a dispersant (product name: RHEODOL SP-O30, available from Kao Corporation) (2 parts by weight) were mixed. The resultant mixture of negative electrode raw materials was defoamed by stirring under reduced pressure to prepare a Nb$_2$TiO$_7$ slurry with a viscosity of 4000 cP. The viscosity was measured with an LVT viscometer available from Brookfield. The Nb$_2$TiO$_7$ slurry was molded into a sheet on a PET film by a doctor blade process to give a Nb$_2$TiO$_7$ green sheet. The dried thickness of the Nb$_2$TiO$_7$ green sheet was adjusted such that the fired thickness was 100 μm. The resultant green sheet was cut into a 25 mm square with a box cutter, and the cut sheet was placed on an embossed zirconia setter. The green sheet on the setter was placed into an alumina sheath, kept at 500° C. for five hours, and then heated at a rate of 200° C./h and fired at 1100° C. for five hours. An Au film (a thickness of 100 nm) was deposited on a face, in contact with the setter, of the sintered Nb$_2$TiO$_7$ sintered plate by sputtering, and the sintered plate was then cut into a 10 mm by 10 mm by a laser process.

Example A7 (Comparative)

A battery was prepared and evaluated as in Example A2 except that the battery operational temperature was 25° C. The results are shown in Table 1.

TABLE 1

| | Positive electrode plate | | | | | Negative electrode plate | |
|---|---|---|---|---|---|---|---|
| | Composition[X] | Mean orientation angle of primary grains (°) | Thickness (μm) | Porosity (%) | Mean pore aspect ratio | Composition[X] | Thickness (μm) |
| Ex. A1 | LCO | 15 | 25 | 10 | 1.2 | LTO | 28 |
| Ex. A2 | LCO | 15 | 200 | 10 | 1.2 | LTO | 224 |
| Ex. A3 | LCO | 15 | 200 | 10 | 1.2 | LTO | 224 |

TABLE 1-continued

| | | | | | | | |
|---|---|---|---|---|---|---|---|
| Ex. A4 | LCO | 15 | 200 | 10 | 1.2 | LTO | 257 |
| Ex. A5 | LCO | 15 | 200 | 10 | 1.2 | LTO | 161 |
| Ex. A6 | LCO | 15 | 200 | 10 | 1.2 | $Nb_2TiO_7$ | 100 |
| Ex. A7* | LCO | 15 | 200 | 10 | 1.2 | LTO | 224 |

| | Negative electrode plate Porosity (%) | Solid electrolyte layer Composition | C/A ratio | Operational temperature (° C.) | Cycle capacity retention (%) |
|---|---|---|---|---|---|
| Ex. A1 | 3 | $Li_3OCl$ | 1.15 | 100 | 97 |
| Ex. A2 | 3 | $Li_3OCl$ | 1.15 | 100 | 96 |
| Ex. A3 | 3 | $Li_3OCl$ | 1.15 | 300 | 90 |
| Ex. A4 | 3 | $Li_3OCl$ | 1.001 | 100 | 92 |
| Ex. A5 | 3 | $Li_3OCl$ | 1.599 | 100 | 95 |
| Ex. A6 | 3 | $Li_3OCl$ | 1.15 | 100 | 97 |
| Ex. A7* | 3 | $Li_3OCl$ | 1.15 | 25 | 70 |

*Comparative examples
×LCO indicates $LiCoO_2$, and LTO indicates $Li_4Ti_5O_{12}$.

Example B1

(1) Production of Positive Electrode Plate
(1a) Preparation of LCO Green Sheet $Co_3O_4$ powder (a mean particle size of 0.3 μm) and commercially available $Li_2CO_3$ powder (a D50 particle size of 2.5 μm) weighed into a Li/Co molar ratio of 1.02 were mixed, and the mixture was kept at 750° C. for five hours. The resultant powder was pulverized in a pot mill into a volume-based D50 of 1 μm or less to give LCO powder composed of platy particles. The resulting LCO powder (100 parts by weight), a dispersive medium (toluene:2-propanol=1:1) (100 parts by weight), a binder (10 parts by weight), a plasticizer (4 parts by weight), and a dispersant (2 parts by weight) were mixed. The mixture was defoamed by stirring under reduced pressure to prepare an LCO slurry with the adjusted viscosity. The resultant slurry was molded into an LCO green sheet onto a PET film by a doctor blade process. The thickness of the LCO green sheet was adjusted such that the fired thickness was 200 μm.

(1b) Preparation of $Li_2CO_3$ Green Sheet (Excess Lithium Source)

Commercially available $Li_2CO_3$ raw material powder (a volume-based particle size D50 of 2.5 μm) (100 parts by weight), a dispersive medium (toluene:2-propanol=1:1) (100 parts by weight), a binder (5 parts by weight), a plasticizer (2 parts by weight), and a dispersant (2 parts by weight) were mixed. The mixture was defoamed by stirring under reduced pressure to prepare a $Li_2CO_3$ slurry with an adjusted viscosity. The resultant $Li_2CO_3$ slurry was molded into a $Li_2CO_3$ green sheet on a PET film by a doctor blade process. The dried thickness of the $Li_2CO_3$ green sheet was adjusted such that the Li/Co molar ratio of the Li content in the $Li_2CO_3$ green sheet to the Co content in the LCO green sheet was a predetermined value.

(1c) Preparation of LCO Sintered Plate

The LCO green sheet was separated from the PET film, and was cut into a 50 mm square. The cut piece was placed on the center of a bottom magnesia setter. The LCO green sheet was heated to 600° C. at a heating rate of 200° C./h, and was degreased for three hours. The LCO green sheet was then kept at 900° C. for three hours to be calcined. The dried $Li_2CO_3$ green sheet was cut into a size such that the Li/Co molar ratio, which was the Li content in the $Li_2CO_3$ green sheet to the Co content in the calcined LCO plate, was 0.5. The cut piece of the $Li_2CO_3$ green sheet, which is an excess-lithium source, was placed on the calcined LCO plate, and a porous top magnesia setter was placed thereon. The calcined LCO plate and the green sheet piece disposed between the top and bottom setters were placed into an alumina sheath having 120 mm square. At this time, the alumina sheath was loosely capped with a small gap. The resultant laminate was heated to 600° C. at a heating rate of 200° C./h, and was degreased for three hours. The laminate was then heated to 800° C. at 200° C./h, and was kept for five hours. The laminate was then heated to 900° C. at 200° C./h, and was kept for 24 hours to be fired. After the firing, the fired laminate was cooled to room temperature, and was removed from the alumina sheath. Thus, the sintered LCO plate was yielded as a positive electrode plate. An Au film (a thickness of 100 nm) was deposited on a face, in contact with the bottom setter, of the sintered LCO plate by sputtering, and the LCO positive electrode plate was then cut into a 10 mm by 10 mm by a laser process.

(2) Production of Negative Electrode Plate
(2a) Preparation of LTO Green Sheet

Commercially available LTO powder (a volume-based D50 particle size of 0.06 μm) (100 parts by weight), a dispersion medium (toluene: 2-propanol=1:1) (100 parts by weight), a binder (20 parts by weight), a plasticizer (4 parts by weight), and a dispersant (2 parts by weight) were mixed. The resultant mixture of raw materials for the negative electrode was defoamed by stirring under reduced pressure to prepare an LTO slurry with the adjusted viscosity. The resulting slurry was molded into an LTO green sheet onto a PET film by a doctor blade process. The dried thickness of the LTO green sheet was adjusted such that the fired thickness was 200 μm.

(2b) Firing of LTO Green Sheet

The resultant green sheet was cut into a 25 mm square with a box cutter and placed onto an embossed zirconia setter. The green sheet on the setter was placed into an alumina sheath and held at 500° C. for five hours, then heated at a rate of 200° C./h and fired at 800° C. for five hours. An Au film (a thickness of 100 nm) as a current collecting layer was deposited on a face, in contact with the setter, of the resultant LTO sintered plate by sputtering, and the LTO sintered plate was then cut into a 10 mm by 10 mm by a laser process.

(3) Production of Inorganic Solid Electrolyte

Commercially available LiOH (purity≥98.0%) and $Li_2SO_4$ (purity≥98.0%) were provided. These raw materials are weighed into a $LiOH:Li_2SO_4$ molar ratio of 3.0:1.0 and mixed in an Ar atmospheric glove box having a dew point of −50° C. or lower. The mixture was placed in a glass tube in an Ar atmosphere and melted by heating at 430° C. for two hours. The glass tube was then placed into water and kept for ten minutes, and the melt was quenched to form a solidified material. The solidified material was then pulverized in a mortar in an Ar atmosphere to give $3LiOH \cdot Li_2SO_4$ powder, which is a solid electrolyte.

(4) Preparation of Battery

A $LiOH$—$Li_2SO_4$ powder containing $ZrO_2$ beads (5 wt %) having a diameter of 30 μm was placed on the positive electrode plate, and the negative electrode plate was then placed on the powder. A weight (15 g) was then placed on the negative electrode plate and the laminate was heated at 400° C. for 45 minutes in an electric furnace. In this heating, the $LiOH$—$Li_2SO_4$ powder was melted followed by solidification to thus form a solid electrolyte layer having a thickness of 40 μm. The resulting unit cells composed of the positive electrode plate, the solid electrolyte, and the negative electrode plate were used to produce a laminated battery.

(5) Evaluation

The following properties were evaluated on the positive electrode plate synthesized in Procedure (1), the negative electrode plate synthesized in Procedure (2), and the battery prepared in Procedure (4).

<Mean Orientation Angle of Primary Grains>

The mean orientation angle of the primary grains in the positive electrode plate was measured as in Example A1.

<Thickness>

The thickness of the positive electrode plate and the negative electrode plate was each measured as in Example A1.

<Porosity>

The porosity of the positive electrode plate and the negative electrode plate was each measured as in Example A1. Although the pores may be partially filled with the inorganic solid electrolyte in Example B1, the term "porosity" in this specification indicates the substantial porosity that also includes portions filled with the inorganic solid electrolyte in the pores throughout the positive electrode plate, unless otherwise specified.

<Filling Rate of Electrolyte>

The cross-sectional SEM image used in the measurement of porosity was analyzed, and the filling rate of electrolyte (%) was calculated through dividing the area of the inorganic solid electrolyte filled in all the pores by the total area of the pores and multiplying the resulting value by 100.

<Residual Porosity>

The residual porosity $P_1$ (%) was calculated by substituting the porosity $P_0$(%) and the filling rate of electrolyte E (%) into the following expression.

Residual porosity $P_1 = P_0 \times (100-E)/100$

<C/A Ratio>

A practical electric capacity (mAh) for an area of 1 cm² of the positive electrode plate was determined at 25° C. to be the capacity C of the positive electrode plate as in Example A1.

<Discharge Capacity Rate>

The discharge capacity of the battery was measured at an operational temperature of 100° C. in the voltage range of 2.7 V to 1.5 V in accordance with the following procedures. In this measurement, the charge/discharge cycles included the charge under constant current at a rate of 1 C until the voltage reached the upper limit and then under constant voltage until the current reached a rate of 0.2 C, followed by the discharge at a rate of 0.2 C until the voltage reached the lower limit. The cycles were repeated three times, and the discharge capacities were measured at each time and averaged to be a mean discharge capacity. The rate of the mean discharge capacity to the practical electric capacity (mAh) of the positive electrode plate was calculated to be a discharge capacity rate (%).

Example B2

A battery was prepared and evaluated as in Example B1 except that a positive electrode plate and a negative electrode plate were produced as follows:

(Production of Positive Electrode Plate)

(a) Preparation of $LiCoO_2$ Shaped Material

Commercially available $LiCoO_2$ powder (a D50 particle size of 7 μm) was uniaxially compressed at 100 MPa in a mold to prepare a $LiCoO_2$ shaped material. The thickness of the shaped material was determined such that the fired thickness was 200 μm.

(b) Preparation of $LiCoO_2$ Sintered Plate

The $LiCoO_2$ shaped material was disposed on an alumina setter, and placed into an alumina sheath. At this time, the alumina sheath was loosely capped with a small gap. The resultant laminate was heated to 925° C. at a heating rate of 200° C./h and kept for 20 hours to be fired. After the firing, the laminate was cooled to room temperature, and the fired laminate was removed from the alumina sheath to give a $LiCoO_2$ sintered plate, which was a positive electrode plate. An Au film (a thickness of 100 nm) was deposited as a current collecting layer on one face of the $LiCoO_2$ sintered plate by sputtering.

(Production of Negative Electrode Plate)

A sintered LTO plate was produced as in Example B1 except that another LTO powder (a D50 particle size of 0.7 μm) was used in Procedure (2a).

Example B3

A battery was prepared and evaluated as in Example B1 except that a positive electrode plate and a negative electrode plate were produced as follows:

(Production of Positive Electrode Plate)

An LCO sintered plate was produced as in Example B2 except that the firing temperature was 775° C.

(Production of Negative Electrode Plate)

An LTO sintered plate was produced as in Example B2 except that the firing temperature was 750° C.

Example B4

A battery was prepared and evaluated as in Example B1 except that a positive electrode plate and a negative electrode plate were produced as in Example B2 and the heating in the electric furnace was performed at 380° C. for 45 minutes in Procedure (4).

Example B5

A battery was prepared and evaluated as in Example B1 except that a positive electrode plate was produced as follows and a negative electrode plate was produced as in Example B2:

(Production of Positive Electrode Plate)

An LCO sintered plate was produced as in Example B1 except that another $Co_3O_4$ powder (a mean particle size of 0.9 μm) was used in Procedure (1a), and the Li/Co molar ratio, indicating the Li content in the $Li_2CO_3$ green sheet placed on the calcined LCO plate, was 0.1 and the maximum temperature was 850° C. in Procedure (1c).

Example B6

A battery was prepared and evaluated as in Example B1 except that a positive electrode plate and a negative electrode plate were produced as follows:
(Production of Positive Electrode Plate)
An LCO sintered plate was produced as in Example B1 except that the Li/Co ratio was 0.6 and the firing was performed at a maximum temperature of 900° C. for 24 hours in Procedure (1c).
(Production of Negative Electrode Plate)
An LTO sintered plate was produced as in Example B1 except that the firing was performed at a maximum temperature of 800° C. for 10 hours in Procedure (2b).

Example B7

A battery was prepared and evaluated as in Example B1 except that a positive electrode plate and a negative electrode plate were produced as in Example B2, $Li(OH)_{0.9}F_{0.1}Cl$ powder produced as follows was used in the solid electrolyte and the solid electrolyte powder was heated at 350° C. for 45 minutes in Procedure (4).
(Production of Solid Electrolyte Powder)
Commercially available LiOH (purity≥98.0%), LiCl (purity≥99.9%) and LiF (purity=99.9%) were provided as raw materials. In an Ar atmospheric glove box having a dew point of −50° C. or lower, each raw material was weighed into a LiOH:LiCl:LiF molar ratio of 0.9:1.0:0.1 and mixed. The resultant mixed powder was transferred into a crucible made of alumina, and the crucible was placed in a quartz tube and sealed with a flange. This quartz tube was fixed in a tubular furnace and heated at 350° C. for 30 minutes. During this heating, an Ar gas having a dew point of −50° C. or lower was injected through a gas inlet at the flange and discharged from a gas outlet, and the mixed powder was stirred. After cooling, the gas inlet and the gas outlet were closed, and the quartz tube was returned into the Ar atmospheric glove box having a dew point of −50° C. or lower and the crucible was recovered. The reactant composite was collected from the crucible and pulverized in a mortar to give $Li_2(OH)_{0.9}F_{0.1}Cl$ powder, which was a solid electrolyte. In this process, the heating temperature and time in an Ar gas atmosphere can be modified as appropriate. In general, the heating temperature should be 250° C. to 600° C., and the heating time should be 0.1 hours or longer.

Example B8

A battery was prepared and evaluated as in Example B1 except that a positive electrode plate and a negative electrode plate were produced as in Example B2, $Li(OH)_{0.9}F_{0.1}Br$ powder produced as follows was used in the solid electrolyte, and the solid electrolyte powder was heated at 350° C. for 45 minutes in Procedure (4).
(Production of Solid Electrolyte Powder)
Commercially available LiOH (purity≥98.0%), LiBr (purity≥99.9%) and LiF (purity=99.9%) were provided as raw materials. In an Ar atmospheric glove box having a dew point of −50° C. or lower, each raw material was weighed into a LiOH:LiBr:LiF molar ratio of 0.9:1.0:0.1 and mixed. The resultant mixed powder was transferred into a crucible made of alumina, and the crucible was placed in a quartz tube, and sealed with a flange. This quartz tube was fixed in a tubular furnace and heated at 350° C. for 30 minutes. During this heating, an Ar gas having a dew point of −50° C. or lower was injected through a gas inlet at the flange and discharged from a gas outlet, and the mixed powder was stirred. After cooling, the gas inlet and the gas outlet were closed, and the quartz tube was returned into the Ar atmospheric glove box having a dew point of −50° C. or lower and the crucible was recovered. The reactant composite was collected from the crucible and pulverized in a mortar to give $Li_2(OH)_{0.9}F_{0.1}Br$ powder, which was a solid electrolyte. In this process, the heating temperature and time in an Ar gas atmosphere can be changed as appropriate. In general, the heating temperature should be 250° C. to 600° C., and the heating time should be 0.1 hours or longer.

Example B9

A battery was prepared and evaluated as in Example B1 except that an LNMO sintered plate produced as follows was used in the positive electrode plate, a negative electrode plate was produced as follows, and the C/A ratio and the discharge capacity rate were measured as follows:
(Production of Positive Electrode Plate)
(a) Preparation of LNMO Green Sheet
Commercially available $Li_2CO_3$ powder, NiO powder, and $MnO_2$ powder were weighed and mixed such that $LiNi_{0.5}Mn_{1.5}O_4$ was synthesized after firing. The mixture was placed into an alumina sheath, heated at 200° C./h and kept at a maximum temperature of 900° C. for four hours, and then kept at 650° C. for four hours followed by cooling at 200° C./h. The resultant powder was pulverized in a mortar and a pot mill such that D50 reached 5 μm or less, and then heated again in the same manner as above. The resultant composite material was pulverized into a volume-based D50 of 1 μm or less to give an LNMO powder. The resulting LNMO powder (100 parts by weight), a dispersive medium (toluene:2-propanol=1:1) (100 parts by weight), a binder (10 parts by weight), a plasticizer (4 parts by weight), and a dispersant (2 parts by weight) were mixed. The mixture was stirred by defoaming under reduced pressure to prepare an LNMO slurry with the adjusted viscosity. The resultant slurry was molded into an LNMO green sheet onto a PET film by a doctor blade process. The thickness of the LNMO green sheet was adjusted such that the fired thickness was 200 μm.
(b) Preparation of LNMO Sintered Plate
The LNMO green sheet peeled from the PET film was cut into a 50 mm square with a cutter, placed on the center of a bottom magnesia setter, and a porous top magnesia setter was placed on the LNMO green sheet. The cut piece of green sheet disposed between two setters was placed in an alumina sheath. At this time, the alumina sheath was loosely capped with a small gap. The resultant laminate is heated to 600° C. at a rate of 200° C./h, and degreased for three hours. The laminate was then heated to 900° C. at 200° C./h and kept for five hours, and kept at 650° C. for four hours to be fired, followed by cooling at a rate of 200° C./h. After the firing, the fired material was removed from the alumina sheath after cooling to room temperature to give an LNMO sintered plate, which was a positive electrode plate. An Au film (a thickness of 100 nm) as a current collecting layer was deposited on a face, in contact with the bottom setter, of the resultant LNMO sintered plate by sputtering, and the LNMO sintered plate was then cut into a 10 mm by 10 mm by a laser process.
(Production of Negative Electrode Plate)
An LTO sintered plate was produced as in Example B2 except that the fired thickness was 150 μm.
(C/A Ratio)
A practical electric capacity (mAh) for an area of 1 cm² of the positive electrode plate was determined at 25° C. to be the capacity C of the positive electrode plate. The practical electric capacity is measured by the charge at a constant current of 0.2 C until the potential relative to lithium metal reached 4.9 V and then at a constant voltage for 10 hours followed by the discharge at a constant current of 0.2 C until the potential relative to lithium metal reached 3.0 V.

(Discharge Capacity Rate)

The discharge capacity rate (%) was determined as in Example B1 except that the voltage range of the charge/discharge cycle was 3.4 V to 1.5 V.

Example B10

A battery was prepared and evaluated as in Example B1 except that an NCM sintered plate produced as follows was used in a positive electrode plate, a negative electrode plate was produced as in Example B2, and the C/A ratio and the discharge capacity rate were measured as follows:

(Production of Positive Electrode Plate)

(a) Preparation of $Li(Ni_{0.5}Co_{0.2}Mn_{0.3})O_2$ (Hereinafter Referred to as NCM (523)) Shaped Material Commercially available $(Ni_{0.5}Co_{0.2}Mn_{0.3})(OH)_2$ powder (a mean particle size of 9 μm) and $Li_2CO_3$ powder (a mean particle size of 2.5 μm) weighed into an Li/(Ni+Co+Mn) molar ratio of 1.15 were mixed. The mixture was heated and kept at 840° C. for 15 hours to give powder composed of NCM (523) particles. The powder was sieved through a nylon mesh (180 mesh), and then uniaxially compressed at 100 MPa for one minute in a mold to produce an NCM (523) shaped material. The thickness of the NCM (523) shaped material was determined such that the fired thickness was 200 μm.

(b) Preparation of NCM (523) Sintered Plate

The NCM (523) shaped material was disposed on an alumina setter, and placed into an alumina sheath. At this time, the alumina sheath was loosely capped with a small gap. The resultant laminate was heated to 920° C. at a heating rate of 200° C./h and kept for 10 hours to be fired. After the firing, the fired material was retrieved from the alumina sheath after cooling to room temperature to give an NCM (523) sintered plate, which was a positive electrode plate. An Au film (a thickness of 100 nm) as a current collecting layer was deposited on a face of the resultant NCM (523) sintered plate by sputtering.

(C/A Ratio)

A practical electric capacity (mAh) for an area of 1 $cm^2$ of the positive electrode plate was determined at 25° C. to be the capacity C of the positive electrode plate. The practical electric capacity is measured by the charge at a constant current of 0.2 C until the potential relative to lithium metal reached 4.25 V and then at a constant voltage for 10 hours followed by the discharge at a constant current of 0.2 C until the potential relative to lithium metal reached 3.0 V.

(Discharge Capacity Rate)

The discharge capacity rate (%) was determined as in Example B1 including the voltage range of charge/discharge cycles.

RESULTS

The results of Examples B1 to B10 are shown in Table 2.

TABLE 2

| | Positive electrode plate | | | | | Negative electrode plate | |
|---|---|---|---|---|---|---|---|
| | Composition[X] | Mean orientation angle of primary grains (°) | Thickness (μm) | Porosity (%) | Filling rate of electrolyte (%) | Residual porosity (%) | Composition[X] | Thickness (μm) |
| Ex. B1 | LCO | Unoriented | 200 | 10 | 92 | 0.8 | LTO | 200 |
| Ex. B2 | LCO | Unoriented | 200 | 30 | 90 | 3.0 | LTO | 200 |
| Ex. B3 | LCO | Unoriented | 200 | 43 | 99 | 0.4 | LTO | 200 |
| Ex. B4 | LCO | Unoriented | 200 | 30 | 73 | 8.1 | LTO | 200 |
| Ex. B5 | LCO | 15 | 200 | 30 | 89 | 3.3 | LTO | 200 |
| Ex. B6* | LCO | Unoriented | 200 | 6 | 35 | 3.9 | LTO | 200 |
| Ex. B7 | LCO | Unoriented | 200 | 30 | 86 | 4.2 | LTO | 200 |
| Ex. B8 | LCO | Unoriented | 200 | 30 | 86 | 4.2 | LTO | 200 |
| Ex. B9 | LNMO | Unoriented | 200 | 30 | 87 | 4.0 | LTO | 150 |
| Ex. B10 | NCM | Unoriented | 200 | 30 | 90 | 3.0 | LTO | 200 |

| | Negative electrode plate | | | | | |
|---|---|---|---|---|---|---|
| | Porosity (%) | Filling rate of electrolyte (%) | Residual porosity (%) | Solid electrolyte Composition | C/A ratio | Discharge capacity rate (%) |
| Ex. B1 | 10 | 91 | 0.9 | $3LiOH \cdot Li_2SO_4$ | 1.39 | 62 |
| Ex. B2 | 30 | 88 | 3.6 | $3LiOH \cdot Li_2SO_4$ | 1.39 | 85 |
| Ex. B3 | 42 | 99 | 0.4 | $3LiOH \cdot Li_2SO_4$ | 1.36 | 90 |
| Ex. B4 | 30 | 70 | 9.0 | $3LiOH \cdot Li_2SO_4$ | 1.39 | 72 |
| Ex. B5 | 30 | 88 | 3.6 | $3LiOH \cdot Li_2SO_4$ | 1.39 | 88 |
| Ex. B6* | 6 | 32 | 4.1 | $3LiOH \cdot Li_2SO_4$ | 1.39 | 20 |
| Ex. B7 | 30 | 86 | 4.2 | $Li_2(OH)_{0.9}F_{0.1}Cl$ | 1.39 | 82 |
| Ex. B8 | 30 | 86 | 4.2 | $Li_2(OH)_{0.9}F_{0.1}Br$ | 1.39 | 80 |
| Ex. B9 | 30 | 86 | 4.0 | $3LiOH \cdot Li_2SO_4$ | 1.19 | 77 |
| Ex. B10 | 30 | 88 | 3.6 | $3LiOH \cdot Li_2SO_4$ | 1.50 | 82 |

*Comparative examples

[X]LCO indicates $LiCoO_2$, LNMO indicates $LiNi_{0.5}Mn_{1.5}O_4$, NCM indicates $LiNi_{0.5}Co_{0.2}Mn_{0.3}O_2$, and LTO indicates $Li_4Ti_5O_{12}$. The battery operational temperature is 100° C. in all Examples.

What is claimed is:

1. A secondary battery comprising:
    a positive electrode plate which is a sintered plate composed of an inorganic material containing a positive electrode active material in an oxide form;
    a negative electrode plate which is a sintered plate composed of an inorganic material containing a negative electrode active material in an oxide form; and
    an inorganic solid electrolyte layer,
    wherein the positive electrode plate has a thickness of 25 μm or more and 500 μm or less, a porosity of 10 to 50%, and 70% or more of pores in the positive electrode plate are filled with the inorganic solid electrolyte;
    wherein the negative electrode plate has a thickness of 25 μm or more and 400 μm or less, a porosity of 10 to 50%, and 70% or more of pores in the negative electrode plate are filled with the inorganic solid electrolyte;
    wherein the battery is charged and discharged at a temperature of 100° C. to 300° C.; and
    wherein the positive electrode plate includes primary grains composed of lithium complex oxide, and the primary grains are oriented at a mean orientation angle of 5° or more and 30° or less to a main face of the positive electrode plate.

2. The secondary battery according to claim 1, wherein the positive electrode plate has a thickness of 25 to 400 μm.

3. The secondary battery according to claim 1, wherein a C/A ratio of capacity C of the positive electrode plate to capacity A of the negative electrode plate satisfies $1.0 < C/A < 1.6$.

4. The secondary battery according to claim 1, wherein the positive electrode active material is a lithium complex oxide represented by $Li_xMO_2$, where $0.05 < x < 1.10$, and M includes at least one selected from the group consisting of Co, Ni, Mn and Al.

5. The secondary battery according to claim 1, wherein grains of the positive electrode active material in the positive electrode plate are physically and electrically connected to each other.

6. The secondary battery according to claim 1, wherein the positive electrode plate consists of the inorganic solid electrolyte and the positive electrode active material.

7. The secondary battery according to claim 1, wherein 85% or more of the pores in the positive electrode plate are filled with the inorganic solid electrolyte.

8. The secondary battery according to claim 1, wherein the positive electrode plate has a mean pore aspect ratio of 1.2 or more.

9. The secondary battery according to claim 1, wherein pores in the positive electrode plate are oriented.

10. The secondary battery according to claim 1, wherein the negative electrode active material is an oxide containing at least Ti.

11. The secondary battery according to claim 1, wherein grains of the negative electrode active material in the negative electrode plate are physically and electrically connected to each other.

12. The secondary battery according to claim 1, wherein the negative electrode plate consists of the inorganic solid electrolyte and the negative electrode active material.

13. The secondary battery according to claim 1, wherein 85% or more of the pores in the negative electrode plate are filled with the inorganic solid electrolyte.

14. The secondary battery according to claim 1, wherein the inorganic solid electrolyte has a melting point lower than the melting point or pyrolytic temperature of the positive electrode plate or the negative electrode plate.

15. The secondary battery according to claim 1, wherein the inorganic solid electrolyte has a melting point that is above a battery operational temperature and not higher than 600° C.

16. The secondary battery according to claim 1, the thickness Te of the inorganic solid electrolyte layer, the thickness Tc of the positive electrode plate, and the thickness Ta of the negative electrode plate satisfy $Te/(Tc+Ta) < 0.25$.

17. A method of manufacturing the secondary battery according to claim 1, comprising the steps of:
    placing inorganic solid electrolyte powder having a melting point lower than the melting point or pyrolytic temperature of the positive electrode plate or the negative electrode plate on one of the positive electrode plate and the negative electrode plate;
    placing the other of the positive electrode plate and the negative electrode plate on the inorganic solid electrolyte powder;
    pressing the negative electrode plate toward the positive electrode plate, or the positive electrode plate toward the negative electrode plate at 100 to 600° C. to melt the solid electrolyte powder and permeate the melt into the pores in the positive electrode plate and/or the negative electrode plate; and
    spontaneously or controllably cooling the positive electrode plate, the molten electrolyte and the negative electrode plate to solidify the molten electrolyte.

18. The method according to claim 17, wherein the secondary battery includes spacers that define the thickness of the inorganic solid electrolyte layer between the positive electrode plate and the negative electrode plate, and the spacers are sandwiched along with the inorganic solid electrolyte powder between the positive electrode plate and the negative electrode plate in the step of placing the negative electrode plate or the positive electrode plate on the inorganic solid electrolyte powder.

* * * * *